April 2, 1963     B. E. THAXTON     3,083,630
WINDOW MOUNTED VENTILATOR

Filed Nov. 7, 1960     2 Sheets-Sheet 1

INVENTOR.
Bernard E. Thaxton
BY
ATTORNEYS

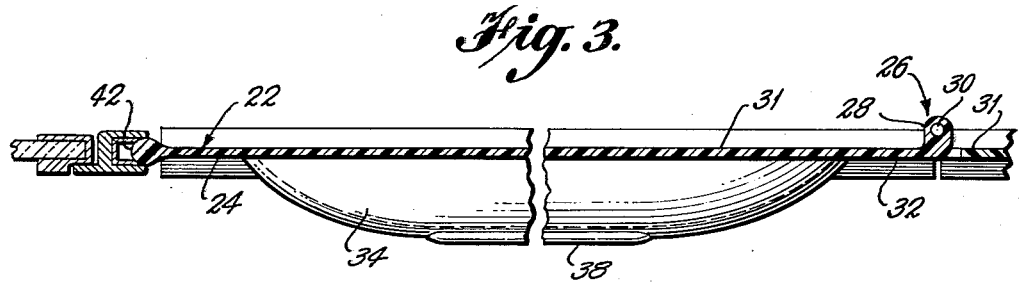
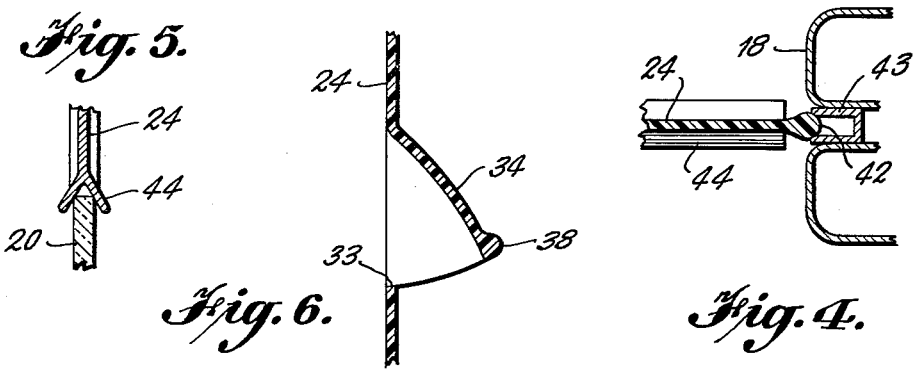
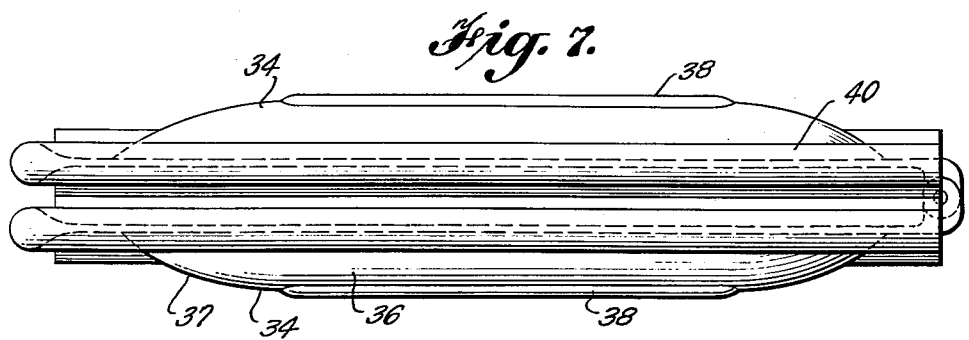
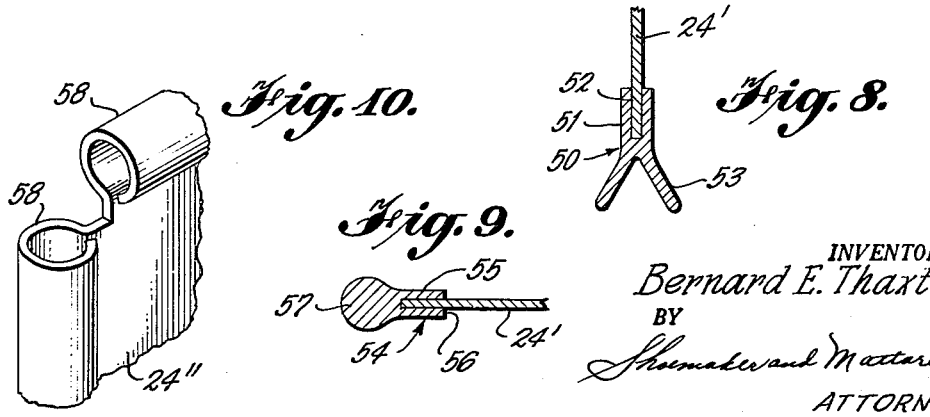

United States Patent Office 3,083,630
Patented Apr. 2, 1963

3,083,630
WINDOW MOUNTED VENTILATOR
Bernard E. Thaxton, 6122 Naval Ave., Lanham, Md.
Filed Nov. 7, 1960, Ser. No. 67,592
4 Claims. (Cl. 98—2)

This invention relates generally to ventilating devices designed for installation in window openings and is directed more particularly to improvements in ventilators for installation in the window of an automobile or like vehicle.

Operators of motor vehicles frequently find it desirable to ventilate the interior of the vehicle while at the same time maintaining the same closed so as to prevent the unauthorized entrance of persons thereinto. For example, in hot weather it frequently becomes necessary for a person to leave his motor vehicle unattended on the street or on a parking lot and it may also be desirable to close the vehicle so that no one can enter it while it is left parked. Under these conditions the interior of the vehicle becomes excessively hot so that it is extremely uncomfortable for occupancy when the operator returns.

It is a particular object of the present invention, in view of the foregoing, to provide a means for permitting circulation of air through the vehicle while it is closed and at the same time keep the vehicle locked so that no unauthorized person can enter the same and to this end there is provided a foldable louvered unit adapted to be positioned in the window opening and designed to be engaged by the window glass in such a way as to effect its secure maintenance in position.

It is also frequently desirable to ventilate the interior of a motor vehicle while traveling during hot weather and this creates a problem by reason of the fact that the interior of the vehicle gets warm and humid, thus causing the windows to steam when they are closed but if it should be raining it is not convenient to travel with the window or windows open because of the entrance of the rain into the window.

Accordingly, it is another object of the invention to provide a ventilator adapted to be installed in the vehicle window opening and which is designed so that air can enter the vehicle while at the same time rain is excluded and furthermore, it is constructed of a transparent material so that the operator of the vehicle will not have his vision completely obstructed through the window opening.

A still further object of the invention is to provide a ventilating unit for the purpose stated which is formed in two foldable sections in such a way that the sections can be positioned or folded flat against one another for convenient storage in the vehicle trunk.

Still another object of the invention is to provide a ventilator unit for installation in a motor vehicle window opening, having louvered openings wherein the louver boards are of novel design to effect the lateral dispersion of moisture which may fall thereon and thus reduce the tendency of air movement flowing through the louver openings to entrain moisture droplets and carry the same into the vehicle.

A further and more specific object of the invention is to provide a novel window ventilator of a molded material wherein the top and side bordering portions are designed to seat in the glass guide-way or channel and wherein the lower marginal portion of the structure is formed in a novel manner to receive and center itself upon the top edge of the window glass so that the installation and proper positioning of the ventilator in the motor vehicle window opening may be easily and quickly accomplished.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 3 is an enlarged sectional view taken substantially on the line 3—3 of FIG. 1.

FIG. 4 is an enlarged sectional detail taken substantially on the line 4—4 of FIG. 1.

FIG. 5 is a sectional detail taken substantially on the line 5—5 of FIG. 1.

FIG. 6 is a detail section taken through one louver board and adjacent portions of the panel.

FIG. 7 is a top edge view of the ventilator unit in folded condition and shown on an enlarged scale.

FIG. 8 is a sectional detail illustrating a modified construction in which the panel is formed of a material separate or distinct from the board edge seating strip.

FIG. 9 is a sectional detail illustrating a construction in which the side and top border bead is of different material from the panel.

FIG. 10 is a sectional detail illustrating the formation of a side and top border bead from the material of the louvered panel.

Figure 1:
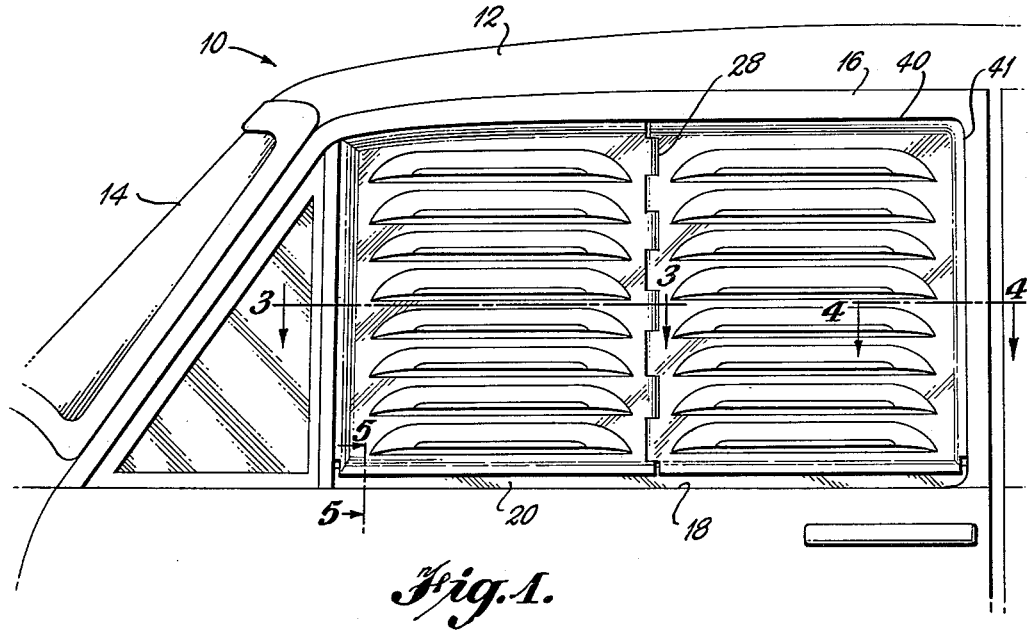
FIG. 1 is a view in side elevation of a foldable ventilator unit constructed in accordance with a preferred embodiment of the present invention and showing the same installed in a motor vehicle window opening.
Figure 2:
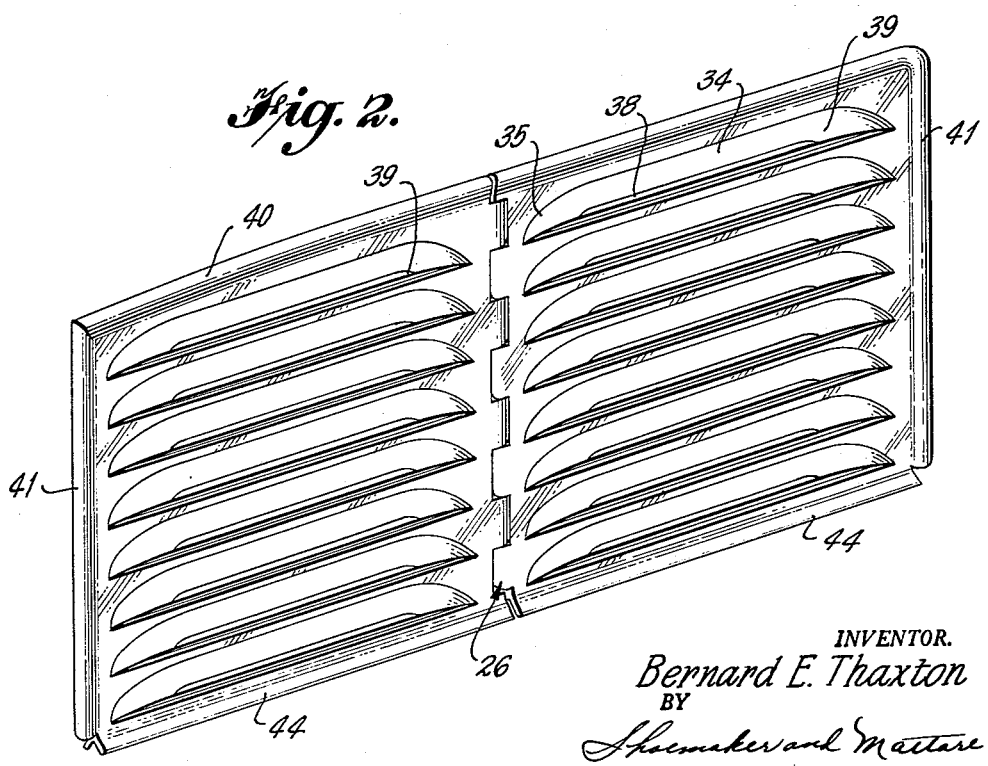
FIG. 2 is a view in perspective of the ventilator unit of FIG. 1 showing the same in opened condition and on an enlarged scale.

Referring now more particularly to the drawings, FIG. 1 illustrates a portion of the front part of a motor vehicle body which is generally designated 10 and wherein the roof is designated 12 and the front or windshield portion is designated 14. Numeral 16 generally designated the vehicle door in which is formed the window opening 18 and in this figure a portion of the top part of the window glass in the opening 18 is illustrated and designated 20, being raised from its extreme lowermost position for engaging and holding in position in the window opening a ventilator unit constructed in accordance with one embodiment of the invention as hereinafter more particularly described.

The ventilator unit illustrated in FIG. 1 and in the succeeding FIGURES 2 to 7 inclusive is generally designated 22. This unit comprises two panel sections, each of which is designated 24 and which, when disposed in operative edge-to-edge aligned relation, are suitably dimensioned to fit within a vehicle window opening as illustrated.

The panels are pivotally coupled together along adjacent vertical edges by a hinge connection which is generally designated 26 and which is preferably of the type known as a piano hinge, the same comprising a plurality of interfitting or interdigitating cylindrical hinge knuckles 28, which are joined together by a single hinge pintle 30 which passes through the aligned knuckles in the well known manner.

The numerals 31 and 32 designate respectively the inner and outer sides of each of the panels and as is illustrated in FIG. 3, the hinge knuckles 28 are located on the inner sides of the panels so as to facilitate the folding of the panels together in parallel relation as illustrated in FIG. 7.

Each of the panels 24 is formed with a series of vertically spaced traversely extending slots or openings 33 and each of these openings is covered or shielded on the outer side of the panel by the outwardly and downwardly curving louver board 34. These louver boards, in addition to being transversely curved as illustrated in FIG. 6, are tapered off at their two ends as is clearly shown in FIG. 2 at 35, which configuration not only gives an attractive appearance to the construction but it also has a function as hereinafter set forth. Each of the louver boards accordingly has a relatively long free edge portion 36 which is straight, as shown in FIG. 7 and which merges at each end with an inwardly curved edge portion 37.

The straight portion 36 of each louver board is bordered by the outwardly projecting longitudinal rib 38 which is tapered off at its two ends as indicated at 39 and which rib, in addition to having the effect of strengthening or stiffening the louver board, also has a function in reducing the tendency of moisture droplets to be entrained in air streams passing through the openings 33 when the ventilator is in use during wet weather.

Each of the panels 24 is bordered along its top and outer sides by the enlarged edge beads 40 and 41 respectively. These bead edges are preferably rounded on the outer sides thereof as is particularly illustrated in FIGS. 3 and 4 at 42, so as to seat snugly in the conventional felt glass channel strip 43 which borders the inner and top portions of the window opening, as illustrated in detail in FIG. 4.

The bottom edge of each panel 24 carries the downwardly opening V seating strip 44 which is of suitable width to receive the top edge of the glass panel 20.

As will be readily apparent, when the ventilator unit it to be put into use the car window glass 20 is run down to its lowermost position and the ventilator unit is set into the window opening in partly opened-out condition so as to facilitate placing the vertical side bead 41 in the vertical glass channel strips. The two panels are then straigthened out or brought into aligned relation as shown in FIG. 3, which action will project the side beads 41 into the vertical glass channel strips and then by running the window up to introduce the top edge of the glass in the bottom seating strip as shown in FIG. 5, the entire ventilator unit can be raised so that the top edge beads 40 will enter the slot, not shown, at the top of the window opening. Thus the top edge of the glass will be pressed firmly into the V seating strip and the top and side bordering beads will be maintained in the adjacent channels and due to the form of the beads they will seat themselves tightly in the channels so that the panels cannot be forced inwardly or outwardly with respect to the window opening.

Obviously, after the ventilator unit is placed in position in the manner stated, the door can be closed and locked and the interior of the car will be fully protected against entrance by unauthorized persons, while at the same time air may freely enter the vehicle and, of course, when two of the units are positioned in window openings at opposite sides of the vehicle, a cross current of air can be maintained to prevent the interior of the vehicle from becoming overheated.

While the ventilator unit may be formed of different types of material, it is preferred that it be formed of a suitable rigid plastic such as Lucite, for example, and in such a case it will be seen that both panels can be completely formed in one piece in a suitable mold and therefore this molded one piece panel formation for the joined panels 24 forming the complete ventilator unit, has been illustrated in FIGS. 1 to 7 inclusive.

As will be readily seen the beaded borders 40 and 41 merge snugly into the main body portions of the panels which may be materially thinner than the beads, as shown in FIG. 3 and, of course, the V seating strip 44 in the bottom of each panel is also continuous with the body of the panel as shown in FIG. 5.

By forming the panels of transparent material it will be seen that the ventilating device could be kept in position in the window opening while the motor vehicle is in operation so as to avoid the development of a steamy atmosphere in the vehicle when the latter is operated in hot wet weather.

Under such conditions also it will be seen that any moisture which is deposited on the curved outer surfaces 34 of the louver boards will run down onto the bordering beads 38 and the formation and curvature of the beads is such as to tend to conduct the moisture toward the ends of the louver boards and thus droplets which might otherwise form along the free edge of the louver board will be conveyed laterally instead of being picked up by air flowing through the louver openings and carried into the interior of the vehicle.

Due to the novel manner in which the hinge portion 26 is arranged it will be seen, upon reference to FIG. 7, that the two panels can be folded into exact parallel relation so as to reduce the thickness of the folded unit to the minimum, the louver boards of the two panels being positioned upon opposite sides of the folded unit.

While in the preceding description it has been stated that the formation of the panels in one piece or integral units and of a suitable plastic material is preferred, it is also to be understood that the novel features of the invention may be embodied in panel structures wherein the body of the panel may be of one type material, such as metal, with the bordering beads and the sealing strip of another material such as plastic or rubber. In this connection reference is had to FIGS. 8 and 9, wherein a portion of a panel is shown in cross section and designated 24, and showing the bottom edge of the panel joined to a seating strip which is generally designated 50 and which strip comprises a slotted band portion 51 in the slot 52 to which the edge of the panel is fixed. The bottom edge of the strip 50 joints the V strip 53, the open side of which is directed downardly as in the case of the strip 44 to receive the top edge of the window glass.

In FIG. 9 the panel 24' is shown as having one of three edges thereof secured in an applied bead unit which is generally designated 54. This unit also embodies a band portion 55 having a slot in the edge thereof as at 56 to receive the edge of the panel and formed integral with the unit 54 is the transversely circular bead portion 57 which serves the same function as the molded bead 40 or 41 hereinbefore referred to. In these modified constructions it will be understood that the parts 50 and 54 may be formed of rubber or suitable plastic or of metal.

Another manner in which the side and top beads for the panels may be formed is illustrated in FIG. 10. Here a portion of a panel is shown in section and generally designated 24" and the bead is formed by rolling an edge portion of the panel material as indicated at 58 thus forming the bead in the nature of a tube having a substantially circular cross section to fit snugly within the window glass guide channel in an obvious manner.

From the foregoing it will be seen that there is provided by the present invention a new and novel ventilator unit for installation in a motor vehicle window opening, which is of simple but strong and durable construction, which may be economically manufactured and marketed and which will function efficiently to accomplish the several desired objects hereinbefore specified.

I claim:

1. A ventilator unit for installation in a window opening having a vertically movable window panel therein and having window frame grooves, said unit comprising a pair of panels, hinge means coupling said panels together along two vertical edges, each panel having a series of vertically spaced transversely extending elongate openings therein, each panel having a portion of the material thereof extending outwardly and downwardly from and along the top of each opening and forming a louver board over the opening, a sealing strip along the top and outer side edge of each panel and comprising a band portion having an edge slot in which the panel edge is seated and a transversely circular bead portion and engageable in the window frame grooves of a diameter greater than the thickness of the band portion, and a seating strip along the bottom edge of each panel and comprising a band portion having an edge slot in which the panel edge is secured and a downwardly opening V-cross section portion for receiving the top edge of the window panel.

2. A ventilator unit for installation in a window opening having a vertically movable window panel therein and having window frame grooves, said unit comprising a pair of sheet metal panels, hinge means coupling the panels together along two vertical edges, each panel having a series of vertically spaced transversely extending elongate openings therein, each panel having a portion of the material thereof extending outwardly and downwardly from and along the top of each opening and forming a louver board over the opening, each panel having a transversely circular rolled edge portion of the material bordering the top and outer side edges thereof and engageable in the window grooves, and the bottom edge portion of each panel carrying a sealing strip of downwardly opening V-cross section for receiving the top edge of the window panel.

3. A ventilator unit for installation in a window opening having a vertically movable window panel therein and having window frame grooves, said unit comprising a pair of panels, hinge means coupling said panels together along two vertical edges, each panel having a series of vertically spaced transversely extending openings therein, each panel having an outwardly and downwardly extending louver board overlying each opening, a sealing means carried by and extending along the top and outer side edge of each panel and having a substantially circular transverse section and being larger diametrically in a direction perpendicular to the panel than the said window frame grooves and engageable in said grooves, and a sealing strip carried by and extending along the bottom edge portion of each panel and having an inverted V-cross sectional form and of materially greater width transversely than the window panel for receiving the top edge of the window panel.

4. The invention according to claim 3, wherein each of said panels together with the said sealing means and the said sealing strip, is formed of plastic.

References Cited in the file of this patent
UNITED STATES PATENTS

| | | |
|---|---|---|
| 1,660,893 | Smith | Feb. 28, 1928 |
| 1,798,600 | Gooch | Mar. 31, 1931 |
| 1,863,428 | Westrick | June 14, 1932 |
| 1,865,961 | Remy | July 5, 1932 |
| 2,749,830 | George | June 12, 1956 |
| 2,758,534 | Smith | Aug. 14, 1956 |
| 2,850,087 | Janaman | Sept. 2, 1958 |
| 2,855,841 | Smith et al. | Oct. 14, 1958 |
| 2,949,842 | Crandal | Aug. 23, 1960 |
| 3,016,952 | Shero | Jan. 16, 1962 |

FOREIGN PATENTS

| | | |
|---|---|---|
| 439,309 | Great Britain | Dec. 4, 1935 |